United States Patent Office 3,169,336
Patented Feb. 16, 1965

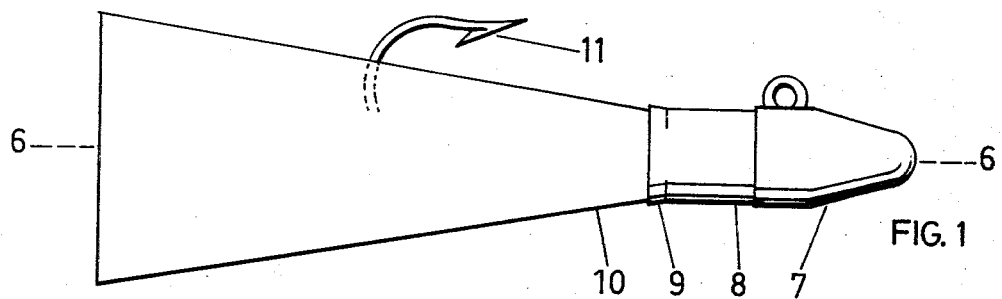
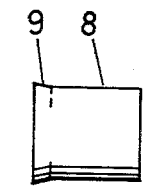
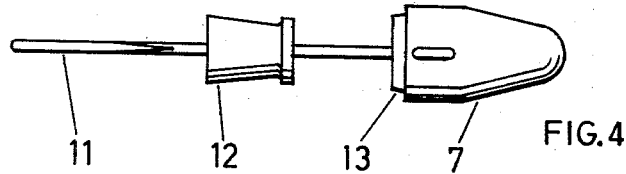
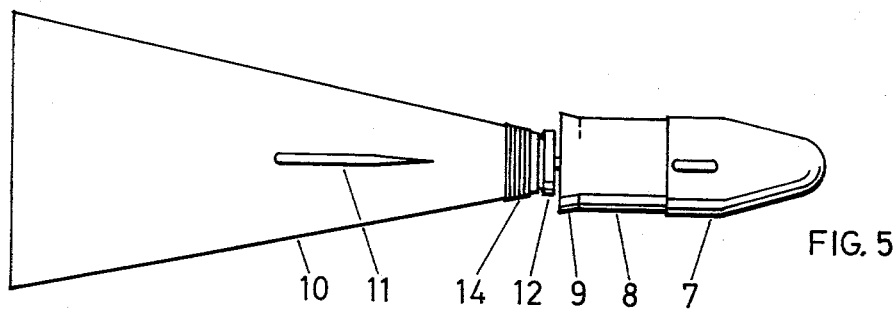
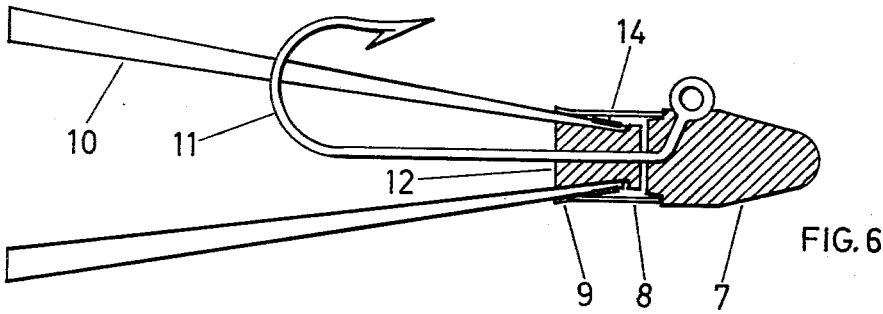

3,169,336
FISHING LURE
Robert E. Pope, Box 1183, Naples, Fla.
Filed Nov. 22, 1963, Ser. No. 325,693
2 Claims. (Cl. 43—42.28)

The present invention relates to improvements in fish lures and in particular to that type of lure known as a jig. The primary object of the invention is to provide a fish lure which incorporates a metal or plastic tubular flanged sleeve which protects and covers the wrapping which secures the tail of the lure to the body of the jig.

A further object of the invention is to provide a fish lure which incorporates a metal or plastic flanged tubular sleeve among its parts and whose parts may be easily and securely assembled.

A still further object of the invention is to provide a fish lure incorporating a metal or plastic flanged tubular sleeve which cooperates with another part of the lure to impart a flared shape to the tail of the lure when completed or assembled.

A still further object of the invention is to provide a fish lure incorporating a metal or plastic flanged tubular sleeve among its parts in such a manner that a streamlined, novel and attractive appearance is created when its parts are completely assembled.

A still further object of the invention is to provide a fish lure incorporating a metal or plastic flanged tubular sleeve, whose parts when assembled provide a means for securing the natural or plastic tail in place and preventing it from being withdrawn from the completed lure.

Other objects and advantages of the invention will become apparent during the course of the following description of the accompanying drawing, wherein FIGURE 1 is a longitudinal elevation view of a fish lure or jig constructed in accordance with the invention and shown in its completed form.

FIGURE 2 is an end elevation view of the plastic or metal tubular flanged sleeve shown in FIG. 3.

FIGURE 3 is a longitudinal elevation view of the plastic or metal tubular flanged sleeve.

FIGURE 4 is a top plan view showing the hook; the tail piece and head of the lure cast on or affixed to the hook. The tail of the lure is not shown.

FIGURE 5 is a top plan view showing the tail of the lure or jig in place on and secured to the tail piece by a wrapping of thread or similar material. The plastic or metal tubular flanged sleeve is shown in position against the head of the lure.

FIGURE 6 is a longitudinal section taken on line 6—6 of FIG. 1, illustrating in detail the manner in which the lure elements are assembled and showing the tail and tail piece moved along the axis of the hook shank until engaging and securing the plastic or metal tubular flanged sleeve.

In the drawing all parts of the fishing lure are numbered using the same number for each part in each figure.

The drawing shows a fish hook 11 in a shape commonly used for lures of this type. The lure of the present invention comprises a plastic or metal head 7 cast on or affixed to the hook 11; a plastic or metal tail piece 12 of conical shape cast on or affixed to the shank of the hook 11; a tubular plastic or metal sleeve 8 having an outwardly flared flange 9 formed at one end; a plastic or natural hair or feathered tail 10; and the wrapping 14 which secures the tail 10 to the tail piece 12.

The drawing shows the complete assembly of all the elements of this lure, the initial position of the tail piece being shown in FIGURES 4 and 5 and the final position of the tail piece being shown in FIGURES 1 and 6.

In FIG. 4 the tail piece 12 and the head 7 are shown cast on to the hook 11. In FIG. 5 the tail 10 is shown in place on the tail piece 12 secured by the wrapping 14. In its final assembled position as shown in FIGURES 1 and 6, one end of the sleeve 8 is supported by a tapered seat 13 formed integrally with the head 7.

FIG. 6 shows the tail assembly, consisting of the tail piece 12 and tail 10 and the wrapping 14, advanced along the axis of the shank of the hook 11 towards the head 7 until the tail 10 engages the flange 9 and secures the sleeve 8 in place. The tail piece 12 is held securely in place by its adhesion to the shank of the hook 11 or by an applied adhesive, thus securing all moving parts of the lure.

It is to be understood that the form of the invention herewith shown and described is to be taken as a preferred embodiment of the same and that various changes in the shape, size, and arrangements may be made without departing from the spirit of the invention or the scope of the sub-joined claims.

I claim:
1. A fish lure comprising a hook having a shank a portion of which is straight, a solid head rigid with one end of said shank, a tail piece slidably carried by said straight shank portion having one end closely adjacent said head, said tail piece being held in adjusted position on said shank by frictional engagement therewith and adapted to be linearly and non-rotatably adjusted thereon, said tail piece having a generally conical outer surface, a tail secured to said surface of said tail piece, and a sleeve having one end detachably engaging said head and having its opposite end in tight engagement with said tail and said opposite end being flared to thereby cooperate with said tail piece to impart a flared shape to said tail.

2. A fish lure comprising a hook having a shank, a portion of which is straight, a solid head rigid with one end of said shank, a tail piece slidably and frictionally secured on said straight shank portion to initially position said tail piece in spaced relation to said head, said tail piece having a generally conical outer surface, a sleeve of sufficiently large diameter to pass over said tail piece for reception on said head, the end of said sleeve remote from said head being outwardly flared, a tail secured to said surface of said tail piece, said surface and said flared end of said sleeve cooperating, when said tail piece is slidably and non-rotatably driven along said shank to a final adjusted position within said sleeve to impart a flared shape to said tail.

References Cited by the Examiner
UNITED STATES PATENTS
1,454,820  5/23  Readle _____ 43—42.28 X
2,315,304  3/43  Upperman _____ 43—42.37 X SAMUEL KOREN, Primary Examiner.
ABRAHAM G. STONE, Examiner.